Patented Aug. 19, 1924.

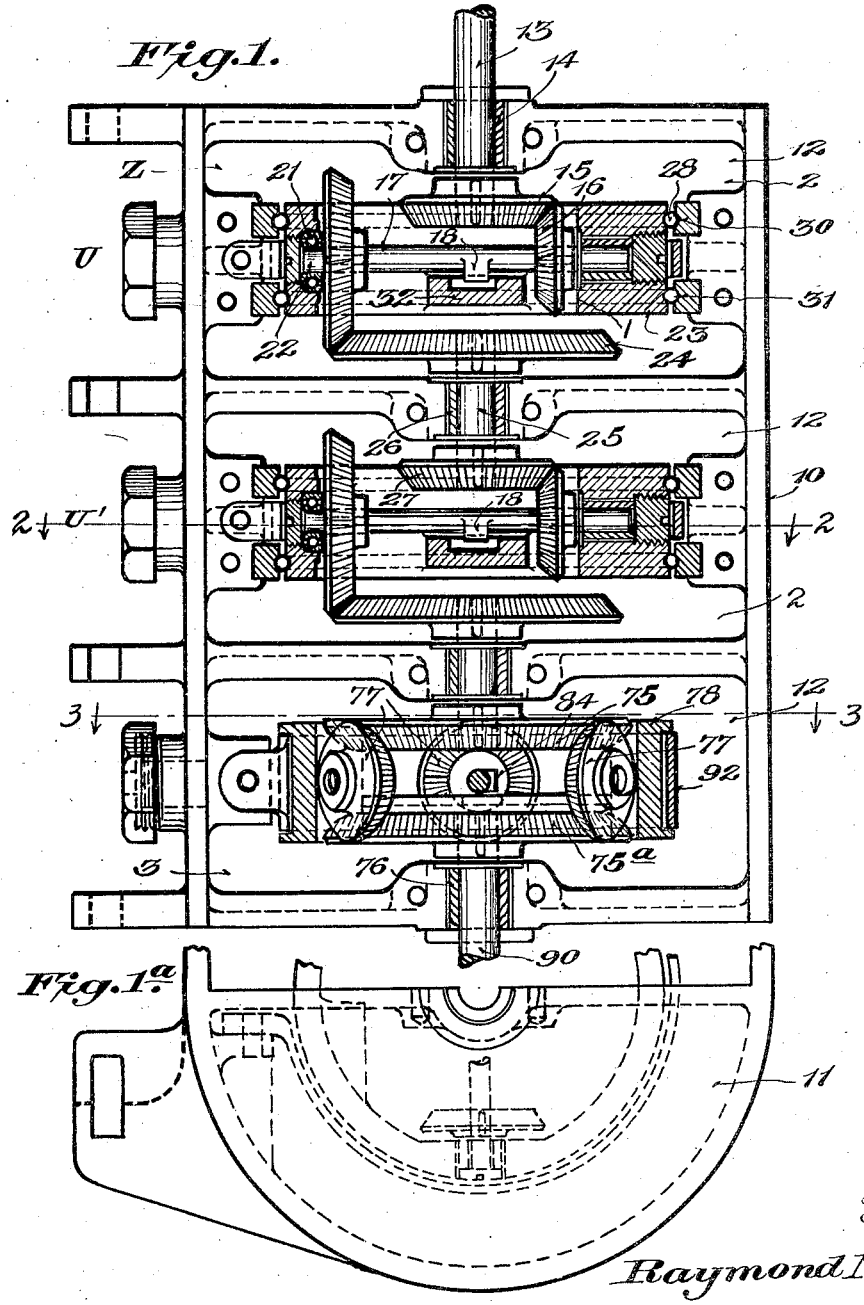

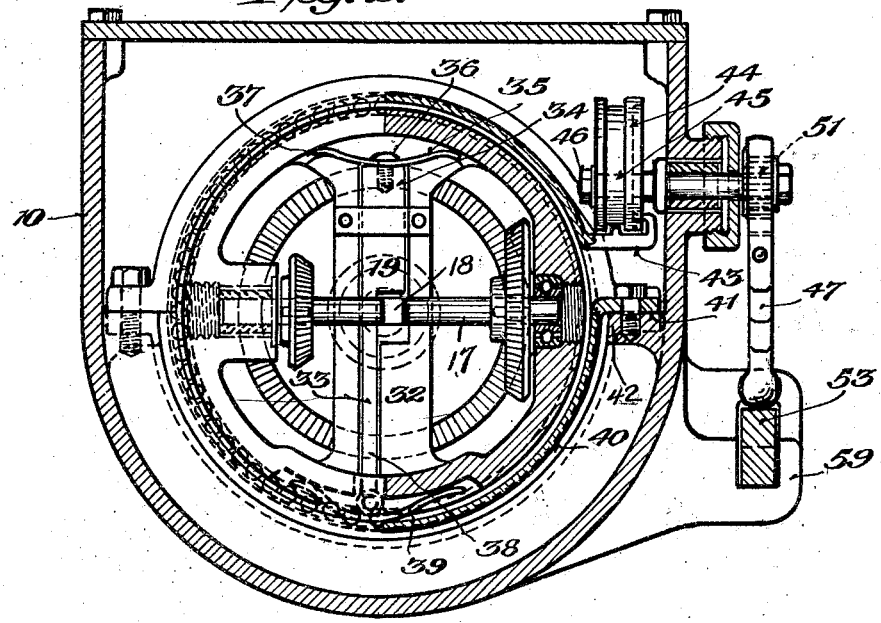
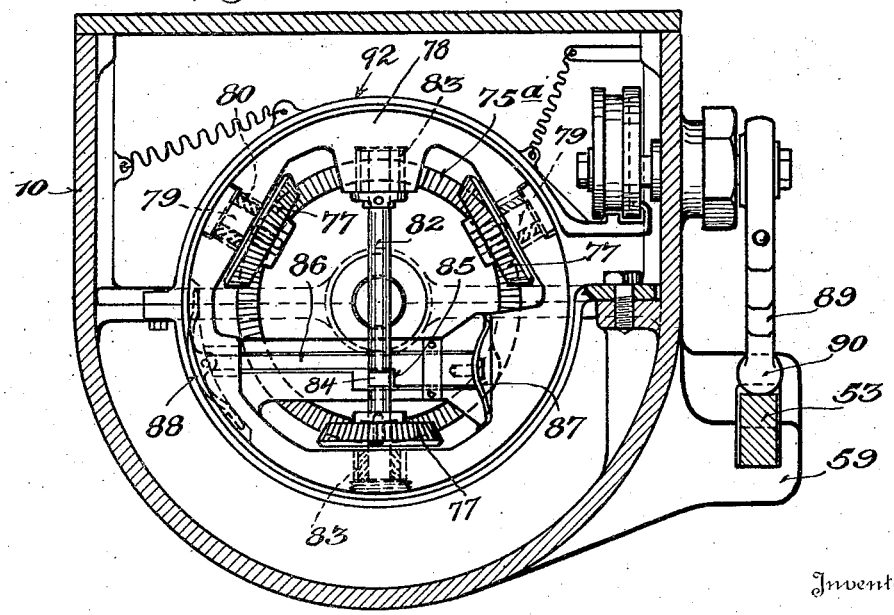

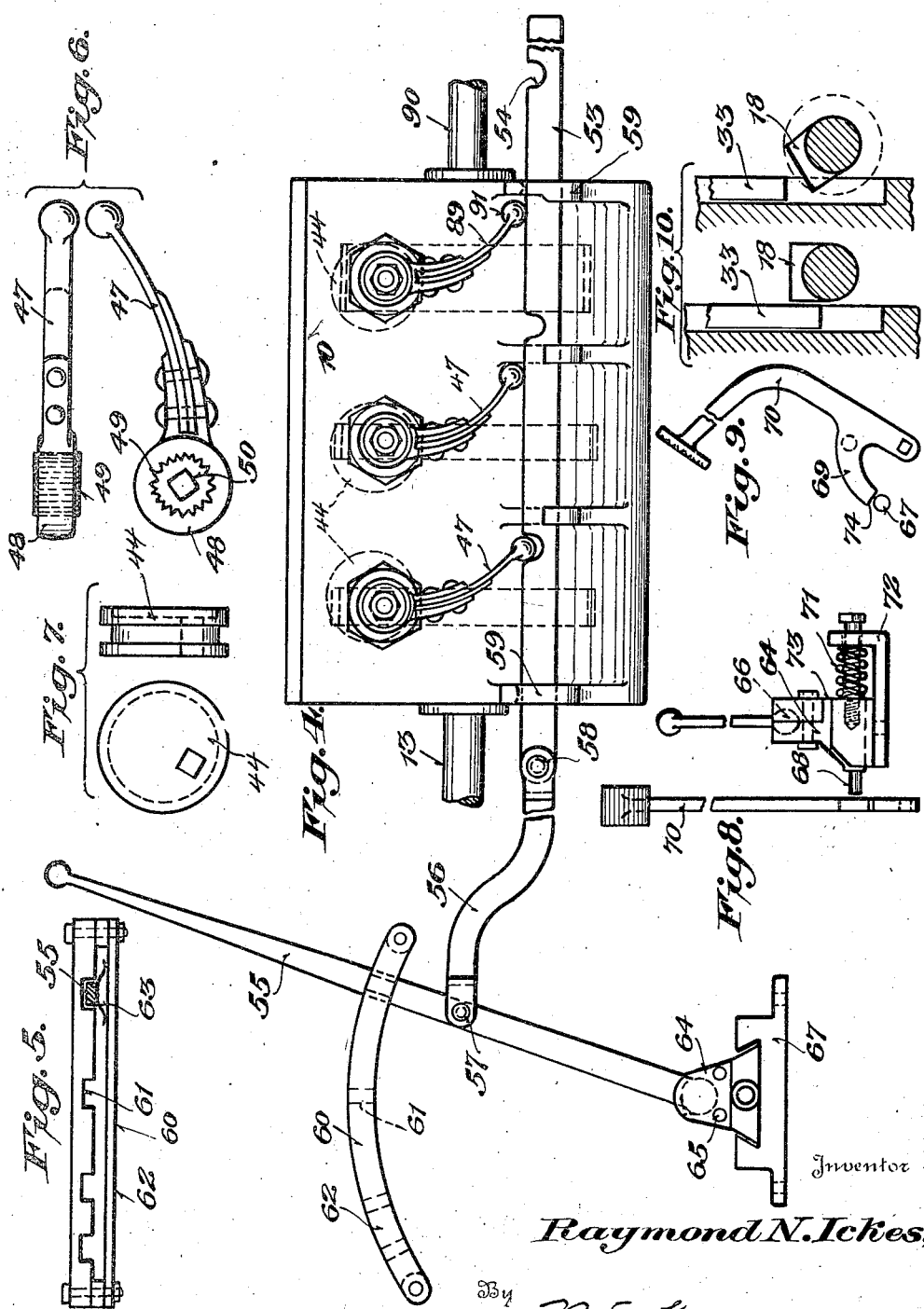

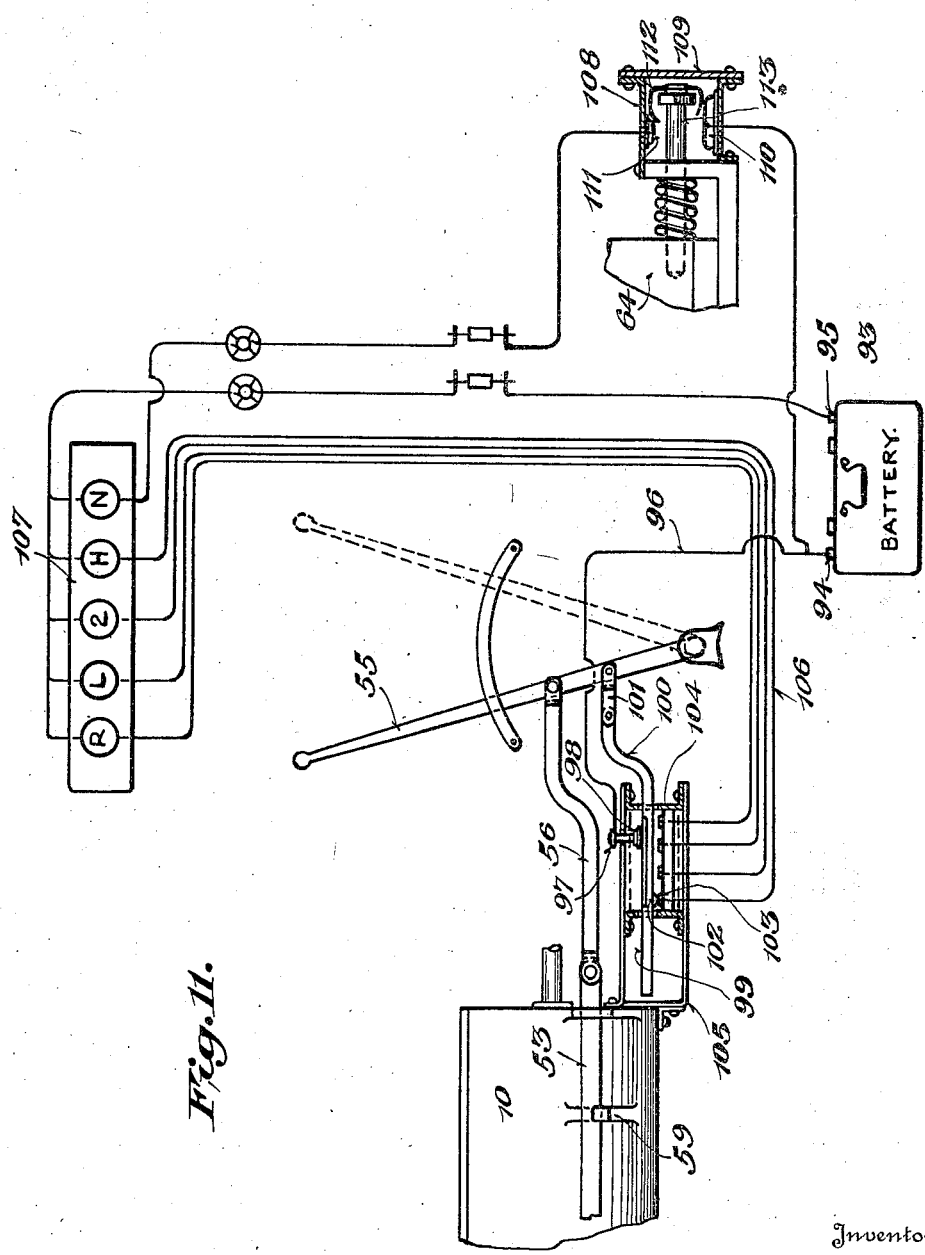

1,505,391

UNITED STATES PATENT OFFICE.

RAYMOND N. ICKES, OF ALTOONA, PENNSYLVANIA.

TRANSMISSION.

Application filed March 13, 1922. Serial No. 543,373.

*To all whom it may concern:*

Be it known that I, RAYMOND N. ICKES, a citizen of the United States, residing at Altoona, in the county of Blair and State of Pennsylvania, have invented certain new and useful Improvements in Transmissions, of which the following is a specification.

This invention relates to motor driven vehicles and other machines and has for its primary object a transmission arrangement whereby continuous transmission of energy is made possible through a system of gears that is arranged to give various speeds and powers without the usual necessity of gear shifting.

A further object of this invention is to provide a power transmission device applicable to motor cars and heavy trucks, that is susceptible of giving any desired number of speed ratios to the car or truck, without the necessity of changing gears, which often results in broken gear teeth and broken or damaged gears.

A still further object of this invention is to provide a power transmission device in which there is no gear rotating when in high gear, which feature will add greatly to the life of the gears and to the transmission.

Another object of this invention is to provide a power transmission device which can be readily used as a brake in case the ordinary foot and emergency brakes fail, this feature adding greatly to the safety feature of heavy trucks when equipped with this type of transmission.

A further object of this invention is to provide a transmission device wherein the operator can instantly select any speed or gear ratio without reference to any other gear or set of gears in the transmission, thus saving the necessity of going through all the various gear changes in going from one extreme to the other.

This feature in combination with a selection indicating feature which I have provided in connection with the transmission assembly adds to the facility and ease with which cars and trucks equipped with this invention can be operated.

With these and many objects in view which will become more readily apparant as the nature of the invention is better understood, the same consists in the novel construction, combination and arrangement of parts as will be hereinafter fully pointed out, illustrated and claimed.

It will be quite readily understood by those skilled in the art to which this invention belongs that the same is quite susceptible to various changes and modifications without departing from the spirit or scope of the invention, but a preferred and practical embodiment of the invention is shown in the accompanying drawings in which:

Figure 1 is a plan view of my improved transmission device showing the forward and the reversing units in operative relation.

Figure 1ª is a partial end elevation of the construction shown in Figure 1.

Figure 2 is a sectional view taken on the line 2—2 of Figure 1, and shows the manner of placing the gears in the housings together with a portion of the gear changing mechanism, together with certain parts of the brake.

Figure 3 is a sectional view taken on the line 3—3 of Figure 1 and shows the arrangement of the gears in the reversing units.

Figure 4 is an elevational view of the gear shift arrangement which provides means through which the various brake bands are released or tightened.

Figure 5 is a plan view of the gear shift lever rack shown in Figure 4 of the drawings.

Figure 6 is a plan and elevational view of one of the tension springs used in connection with the gear shift arrangement shown in Figure 4 of the drawings.

Figure 7 is an elevation and edge view of the eccentric used in connection with the brake band shown in operation position in Figures 2 and 3.

Figure 8 shows a view of the clutch pedal arrangement used in connection with this transmission.

Figure 9 shows another view of the clutch pedal.

Figure 10 shows two views of the bar used in the gear ratio changing operation.

Figure 11 shows a view of the gear selective indicating arrangement used in connection with my new transmission.

Similar reference numerals refer to similar parts throughout the several figures of the drawings.

In carrying out this invention and its application to a modern automobile or truck, I do not alter the construction of the gasoline engine or any part associated therewith, nor do I alter the differential or the parts thereof, but instead of the usual sliding gear transmission as usually applied to both the gasoline and steam cars, I provide my new type of transmission designated in its entirety by the numeral 10, and consists primarily of a casing 11, in which is positioned a plurality of driving unit compartments 12. Each compartment is provided with an individual gearing unit, the number of said units determine the number of forward speeds in the transmission, hence it is possible to obtain any speed by the gear ratio in the compartment.

In the application of this transmission to an automobile or truck, the drive shaft 13 is continued back from the clutch, and passes through a roller bearing 14, which is preferably provided with a suitable design of thrust bearing, and has securely attached thereto a spiral bevel gear 15, which is adapted to mesh with a similar gear 16, which is securely attached to a drive shaft 17, positioned at right angles to the primary drive shaft 13, and has positioned thereon as an integral part thereof, a lug 18, adapted to engage a slide bar 19 when rotation of the shaft is to be restricted.

The shaft 17 is further provided with a spiral bevel gear 20 which rotates on a shaft extension 21, adapted to rest in a ball thrust bearing 22, positioned in a rotatable ball bearing frame 23.

The gear 20 is adapted to mesh with and drive a similar gear 24, which is securely attached to a shaft 25 and rotates in a combined ball thrust or roller bearing 26, a gear 27 attached to the opposite end of shaft 25 is similar in all respects to the bevel 15 shown in the first unit.

The units designated as U and U', are similar and the description of one will suffice for that of the other. Let us assume that shaft 13 is rotating in the direction of the arrow and the bevel gear 15 meshes with the gear 16 which will revolve toward the gear 16, the gear 20 being positioned on the shaft 13, the gear 20 being positioned on the shaft 17 will rotate the gear 24 in the direction shaft 13 rotates at a speed proportional to the gear ratio. If the shaft 17 is prevented from rotating through the action of lug 18 engaging the bar 19, (which action will be fully explained later in the specification) and the shaft 13 continues to rotate, gear 16 will travel around gear 15 at the same speed of rotation as the shaft 13, carrying with it the frame 23 which rotates on ball bearings 28, positioned in races 30, and 31, on either side of the frame. The speed of the gear 24 will likewise be the same as the speed of the shaft 13.

Referring now to Figure 2 of the drawings which shows a sectional view taken on the line 2—2 of Figure 1 it will be observed that the frame 23 is provided with a cross bar 32, in which there is adapted to slide a locking plate 33. The locking plate 33 is provided at the uppermost end 34 with a leaf of a semielliptical spring 35, the center portion of which is secured to the sliding plate 33 through a screw 36 or similar means. The ends of the spring 35 engage the surface 37 of the frame 23, as shown in Figure 2 of the drawings.

The opposite end 38 of the bar 33 is likewise provided with a leaf of a semielliptical spring 39, which is adapted to augment the function performed by the spring 35, viz, in keeping the bar 33 down in such position that the bar will engage the lug 18 on the shaft 17 and prevent the same from rotating at which time unit designated at U will be in what is known as high gear or the drive will be direct through to gear 24 without any change of speed of rotation.

In order that the gears in unit U as well as U' or similar units may be thrown into action some positive means must be provided to push the bar 33 back out of engagement with the lug 18 on the shaft 17. This mechanism must necessarily consist of a selective device such that the unit desired can be thrown from the high gear position in which the frame 23 travels around the gears 15 and 24 to any other position desired in which the frame is clamped by the band 40 and held such that the gears 16 and 20 rotate and thereby drive the gear 24 as explained above.

The band 40 is fixed at one end 41, to a lug 42 positioned on the inside face of the case 11 which carries the units U and U'. In order to clamp the band 40 on the frame 23 the free end 43 is interlocked with an eccentric disk 44 which is rotated by means of a shaft 45, which is adapted to pass through a square hole in the disk 44, and secured thereto by a nut 46, as shown in Figure 2 of the drawings.

For the purpose of rotating the shaft 45 there is provided a resilient element 47 having attached thereto a circular head 48 in which a toothed disk 49 is adapted to fit. The toothed disk 49 has a square opening 50 which is adapted to fit the opposite end 51 of the shaft 45. The construction of the toothed disk 49 readily permits of any adjustment of the head which is essential in order to get the correct tension of the brake band 40 on the frame 23.

The resilient element 47 is preferably made from a piece of leaf spring steel and provided with an end terminating in a ball 52 which is adapted to rest on the top edge of a slide bar 53, or engage one of the recesses 54 cut therein as clearly shown in Figure 4 of the drawings. The slide bar 53 is operated through a lever 55 to which the bar 53 is attached through a connecting link 56 having a pin connection at the ends 57 and 58, as shown in Figure 4 of the drawings. The bar 53 is provided with adequate supports 59, each of which are made as an integral part of the case.

The actuating lever 55 is provided with a rack 60, which contains a plurality of recesses 61, each of which corresponds to a notch 54 in the bar 53. A bar 62 against which a leaf spring 63 is adapted to press serves to keep the operating lever 55 in position and also to keep the same from rattling due to the motion of the car.

The operating lever 55 is provided with a sliding fulcrum designated in its entirety by the numeral 64, and consists essentially of a fulcrum block 65 in which a ball shaped end 66 of the lever 55 is adapted to rest. The fulcrum block 65 is preferably dovetailed in a base block 67 which is adapted to rest on the floor of the car or other stationary part. The fulcrum block 65 is provided with a projection 68 that impinges against a quadrant arm 69 of the clutch pedal 70, and continues to press against the quadrant by virtue of a helical spring 71 which is positioned between the upright standing lug 72 and the face 73 of the sliding fulcrum block 65 as shown in Figure 8 of the drawings. The clutch lever having been pushed ahead to its farthest position the pin 68 passes in behind the end 74 thus locking the clutch out of engagement. This action serves to keep the transmission neutral. To throw the clutch in again the quadrant rack 60 is used as a fulcrum and the fulcrum block 65 is pressed against the helical spring 71, overcoming the spring tension and permitting the clutch lever to again return to the clutch engaged position at which time the car will move by virtue of the gears in the units being in operation.

Referring now to Figure 3 of the drawings which is a section taken on the line 3—3 of Figure 1 and is termed the reverse unit in that, within this unit, the reverse action of the car is obtained. This unit consists essentially of a plurality of helical bevel gears 75 and 75ª of the same size each mounted on shafts which rotate in combined radial and thrust bearings 76. Meshing with these gears there are preferably three bevel gears 77 spaced 120° apart to give an even balance for operation. Two of the gears 77 act as idlers and assist to reverse the motion. The idle gears are each positioned in a frame 78. The two idler gears are designed to rotate on short shafts 79, held rigidly in the frame. The gears are preferably provided with antifriction thrust bearings 80, as shown in Figure 3 of the drawings. The bevel gear 81, is positioned on a shaft 82 which is carried in bearings 83, located diametrically opposite each other in the frame 78. The shaft 82 is further provided with a projection 84 which is adapted to engage a right angled shoulder 85 on a locking bar 86 by virtue of the resilient elements 87 and 88 tending to keep the locking bar in contact with the lug on the shaft. When this condition obtains spring 89, Figure 4, rests on the bar 54 and the gear 77 is locked against rotation. The gear being thus locked against rotation causes the frame 78 to revolve as one unit carrying the gears positioned therein around the shaft 13 as a center, and the direction of motion of shaft 90 will be the same as that of the shaft 13 at the opposite end of the transmission.

Let us now assume that the lever 55 is thrown to the opposite end of the rack 60, to such a point that the ball 91 will engage the recess 54 in the lever 53. Drawing the lever the band 92 will be tightened around the frame 78, compressing the springs 87 and 88, thus pushing the locking bar 86 back such that the shoulder 85 will be disengaged from the lug 84 on the shaft 82 permitting gear 77 to revolve while the frame 78 is held from revolving by the brake band 92, the gear 75 now revolves in one direction while the gear 75ª turns in the reverse direction, hence this unit is known as the reversing unit.

Having thus placed the car in reverse gear by moving the lever 55 as described, if we begin to move the lever back towards its former position we will first disengage the ball 91 from the recess 54, the band 92 will release frame 87 and the bar 86 will again slide back until the lug 84 engages the shoulder 85 on the bar causing the gear 81 to stop rotation, the frame 87 will then revolve as stated above giving the car its former forward motion.

If we continue to draw the lever 55 back we release the brake band 40 on the second unit releasing the frame 23 and permit the locking bar 33 to move down by virtue of the springs 35 and 39, and thus bring the lug 18 into engagement with the slide bar thus stopping the rotation of the gears at which time the frame 23 will revolve as stated above.

I have provided my new transmission with an indicating device which is adapted to show the operator at a glance the unit in the transmission that is in operation with reference to the low speed gear, the intermediate, high or neutral, and this device consists primarily of battery designated by the numeral 93 having the usual positive and negative poles 94 and 95 respectively. From the positive pole 94, a wire 96 is led off and attached to a terminal 97, the face 98 of which makes a wiping contact with the top surface 99 of a sliding bar 100 attached to the lever 55 through a link 101 as shown in Figure 11 of the drawings. The bar 100 is further provided with a contact point 102 which is adapted to coact with a similar contact point 103 positioned in a water proof box 104 located and carried by a bracket 105, secured to the case 11 of the transmission. The contact point 103 is connected by a wire 106 to an indicating register or lamp box 107 in which there is positioned a lamp H through which current passes to the opposite or negative pole 95 of the battery. This indication tells the driver at once that the third unit is in operation and that the car is in high gear as shown by the lamp H being lighted.

The high, intermediate, low and reverse positions are located such as to give a corresponding letter indication in the lamp box, when the lever 55 is thrown to such position.

Since the neutral position of the gear depends upon the position of the clutch pedal 70, it being necessary to push this lever down to such a position that the pin 65 locks with the quadrant 69 it is essential that any indicating mechanism that is attached to the transmission would have to be identified with this locking movement, and to this end I have designed a contact device designated by the numeral 108 and consists primarily of a housing 109, in which there is positioned a plurality of wiping contact points 110 and 111 each of which are adapted to be engaged by a sliding contact wiping bar 112 which is attached to a bolt 113 attached to a sliding block 64 and adapted to move by virtue of an helical spring 71 as shown in Figure 8 of the drawings. It will thus be seen that when the foot pedal is pushed forward the pin 68 will pass in behind the end of the quadrant 69 permitting the spring 71 to extend and thus draw the contact points 110, 111 and 112 together completing the electric circuit from the positive side of the battery through the lamp designated by the letter N, to the negative side of the battery.

By the use of a separate lever attached to the lever 55, Figure 4, and extending back to the reverse unit lever 89 it is quite possible to first throw in the reverse unit, then through the operation of the lever 55 in the usual manner it is possible to obtain any desired speed in reverse motion. This feature is found quite useful in heavy cars and heavy trucks.

It will be comparatively easy for any skilled in the art to which this invention belongs to make various changes and modifications without departing from the spirit or scope of the invention, and it is further believed that the same can be readily understood without further description.

I claim:—

1. In combination with a power transmission device, power units forming the device, a frame in each unit, means for rotating the frame, a shaft carried in the frame, bevel gears on the shaft, a lug on the shaft, a locking bar adapted to engage the lug to prevent rotation and means for engaging and disengaging the bar from the lug.

2. A transmission device including a plurality of speed gearing units and a reverse gearing unit, said speed gearing units each comprising a driving and driven gear, a frame rotatably mounted between said driving and driven gears, a diametrically disposed shaft carried by said frame and rotatable therein, gears on said shaft respectively meshing with said driving and driven gears, means for normally locking said shaft against rotation, and manually controlled means for releasing said locking means.

3. A transmission device including a plurality of speed gearing units and a reverse gearing unit, said speed gearing units each comprising a driving and driven gear, a frame rotatably mounted between said driving and driven gears, a diametrically disposed shaft carried by said frame and rotatable therein, gears on said shaft respectively meshing with said driving and driven gears, means for normally locking said shaft comprising an off-set lug on the shaft, a spring pressed locking bar arranged at right angles to the shaft, and manually controlled means for shifting said bar out of obstructing relation with said lug.

4. A transmission device including a casing, speed gearing units and a reversing gearing unit mounted in said casing, each of said units including driving and driven gears mounted in axial alignment and frames rotatably mounted in said casing between the driving and driven gears of each unit, gearing mounted in and carried by the said rotatably mounted frames, locking members arranged substantially diametrically of said rotatable frames, compressible bands surrounding the frames and adapted to release said locking members, cams for manipulating said bands, actuating arms for said cams and a manually shiftable bar common to all of said actuating arms.

5. In a transmission device of the class described, the combination with a driving and driven gear of a rotatable frame having a shaft disposed diametrically thereof and journaled therein, an offset lug on the shaft, gears carried by the shaft and meshing with said driving and driven gears, a locking member also arranged diametrically of the rotatable frame and disposed at right angles to said shaft, a spring for maintaining said locking member in obstructing relation to said lug, and a relatively contractible band surrounding the frame and adapted to engage with said locking member to shift it against the tension of said spring thereby to release it from locking relation to said lug.

In testimony whereof he affixes his signature.

RAYMOND N. ICKES.